(12) United States Patent
Kurk et al.

(10) Patent No.: US 6,428,806 B1
(45) Date of Patent: Aug. 6, 2002

(54) HERBAL WEIGHT LOSS SUPPLEMENT

(76) Inventors: Mitchell Kurk, 310 Broadway, Lawrence, NY (US) 11559; Odilza Vital, Av. Ary Parreiras N° 327, Niterói, RJ 24230-320 (BR)

(\*) Notice: Subject to any disclaimer, the term of this patent is extended or adjusted under 35 U.S.C. 154(b) by 0 days.

(21) Appl. No.: 09/955,814

(22) Filed: Sep. 19, 2001

Related U.S. Application Data

(60) Provisional application No. 60/235,171, filed on Sep. 20, 2000.

(51) Int. Cl.$^7$ ............... A61K 47/06; A61K 9/68; A61K 9/28
(52) U.S. Cl. ............... 424/439; 424/440; 424/441
(58) Field of Search ................ 424/439, 440, 424/441

(56) References Cited

U.S. PATENT DOCUMENTS

| | | | |
|---|---|---|---|
| 5,612,039 A | \* | 3/1997 | Policappelli et al. .... 424/195.1 |
| 5,925,377 A | | 7/1999 | Gerth et al. |
| 5,985,282 A | | 11/1999 | Haveson |
| 6,277,396 B1 | \* | 8/2001 | Dente ...................... 424/439 |

FOREIGN PATENT DOCUMENTS

| WO | WO/00/12080 | \* | 3/2000 |
|---|---|---|---|

\* cited by examiner

*Primary Examiner*—Carlos Azpuru
(74) *Attorney, Agent, or Firm*—Fay, Sharpe, Fagan, Minnich & McKee, LLP

(57) ABSTRACT

A dietary supplement composition includes an effective amount of garcinia cambogia, glucomanan, guar gum, and chromium picolinate in a freely soluble powder form which can be added to a variety foods and water. Alternately, the composition includes an effective amount of chitosan. Preferably, the composition is administered three times per day by mixing it with liquid-based foods and water.

16 Claims, No Drawings

HERBAL WEIGHT LOSS SUPPLEMENT

CROSS REFERENCE TO RELATED PROVISIONAL APPLICATION

This application claims the benefit under 35 U.S.C. §119(e) of U.S. Provisional Application No. 60/235,171, filed Sep. 20, 2000.

BACKGROUND OF THE INVENTION

The present invention relates to compositions for reducing weight, maintaining weight loss over an extended period of time, and diminishing the appetite. It finds particular application in conjunction with herbal compositions for reducing weight in humans and will be described with particular reference thereto. However, it is to be appreciated that the present invention will also find application in reducing weight in domestic animals.

It is a well-established fact that being overweight and obesity are unhealthy conditions. These conditions are associated not only with social stigma, but are also associated with decreased longevity and numerous medical problems, such as diabetes, reproductive disorders, dermatological disorders, varicose veins, and heart disease.

Existing therapies for people who are overweight or obese include treatments to establish a negative energy balance. This may be accomplished by reduction of energy intake, such as a low calorie diet, or an increase in energy expenditure, such as increased physical exercise. In addition, treatments include ingestion of sympathomimetic drugs which stimulates thermogenesis, i.e. increases the metabolic rate. Known thermogenic drugs include ephedrine, phenylpropanolamine, and caffeine. However, such drugs are rather ineffective.

Obesity is also treated with drugs that suppress appetite by acting on the noradrenergic neurotransmitter, such as nazindol and derivatives of phenethylamine. Other prior art treatments include the use of drugs which act on the serotonin neurotransmitter, such as fenfluramine, tryptophan, fluoxetine, and sertraline. However, all of these drugs have undesirable side effects.

In order to avoid such undesirable side effects, a variety of herbal compositions have been used to promote weight loss. Conventionally, these compositions have been administered in a pill form to be taken orally. Unfortunately, many people have trouble swallowing pills and/or capsules.

Accordingly, the present invention contemplates a new and improved herbal weight loss composition which overcomes the above-referenced problems and others.

SUMMARY OF THE INVENTION

In accordance with one aspect of the present invention, a dietary supplement composition includes an effective amount of glucomanan, chromium picolinate, garcinia cambogia, and guar gum.

In accordance with a more limited aspect of the present invention, the composition takes form in a freely soluble powder.

In accordance with another aspect of the present invention, a dietary supplement composition includes an effective amount of glucomanan, chromium picolinate, garcinia cambogia, and chitosan.

In accordance with another aspect of the present invention, a composition comprises a dosage taken three times per day of a freely soluble powder comprising glucomanan, chromium picolinate, and garcinia cambogia in an amount effective for reducing and controlling weight.

In accordance with a more limited aspect of the present invention, the dosage taken three times per day includes 50 mg of glucomanan, 300 mg of garcinia cambogia, 100 mcg of chromium picolinate, 400 mg of chitosan, and 5 mg of Mexican yam.

In accordance with a more limited aspect of the present invention, the dosage to be taken three times daily includes 75 mg of glucomanan, 500 mg of garcinia cambogia, 100 mcg of chromium picolinate, 50 mg of guar gum, and 5 mg of red bean extract.

In accordance with another aspect of the present invention, a method of reducing and controlling weight includes administering three times a day to a subject an effective amount of a freely soluble powder composition comprising garcinia cambogia in an amount ranging from 200 mg to 300 mg, glucomanan in an amount ranging from 25 mg to 100 mg, guar gum in an amount ranging from 25 mg to 100 mg, chromium picolinate in an amount ranging from 50 mcg to 200 mcg, and red bean extract in an amount ranging from 5 mg to 20 mg.

In accordance with a more limited aspect of the present invention, the administering step includes mixing the freely soluble powder composition with a liquid-based food.

In accordance with a more limited aspect of the present invention, the administering step includes mixing the freely soluble powder composition with one liter of water.

One advantage of the present invention is that it is a natural product with little or no side effects.

Another advantage of the present invention is that it diminishes appetite, producing weight loss.

Yet another advantage of the present invention resides in an herbal weight loss composition that is freely soluble in foods and water with little or no taste.

Other benefits and advantages of the present invention will become apparent to those skilled in the art upon a reading and understanding of the preferred embodiment.

DETAILED DESCRIPTION OF THE PREFERRED EMBODIMENTS

The present invention is directed to a composition comprising at least four of chromium picolinate, guar gum, garcinia cambogia, glucomanan and chitosan.

Chromium picolinate is an organic compound of trivalent chromium and picolinate acid. Chromium picolinate is known to possess fat burning properties.

Garcinia cambogia is an herbal component which inhibits lipogenesis, lowers the production of cholesterol and fatty acids, increases the production of glycogen in the liver, suppresses appetite, and increases the body's production of heat by activating the process of thermogenesis.

Glucomanan is a natural dietary, calorie-free, high fiber powder which is obtained from the root of amorphophallus konjac. Glucomanan has the property of being an appetite suppressant due to the fact that it may absorb liquid up to fifty times its weight.

Guar gum is a hot and cold water soluble polymer which is extracted from guar seeds, otherwise known as cyamopsis tetragonoloba. Guar gum is a known component in slimming aids, nutritional foods, and high water soluble dietary fiber formulations.

Chitosan is a fiber composed of chitin, which is a component of the shell of shellfish. Chitin may be processed so that it has a high binding, that is, absorption, affinity for fat and cholesterol within the digestive tract. Because of this, fibers such as chitosan can absorb many times their weight of fat and cholesterol.

In one embodiment, one dosage of the weight loss composition includes 200 mg–600 mg of garcinia cambogia, 25 mg–100 mg of glucomanan, 25 mg–100 mg of guar gum, and 50 mcg–200 mcg of chromium picolinate. In a preferred embodiment, the weight loss composition includes 500 mg of garcinia cambogia, 75 mg of glucomanan, 50 mg of guar gum, and 100 mcg of chromium picolinate. In one embodiment, the above composition is taken by the patient three times daily. However, it is to be appreciated that varying dosage frequency, such as twice per day, is contemplated depending upon a subject's particular needs.

In another embodiment, a variable quantity of red bean extract, ranging from 5 mg to 20 mg, is included in the composition. It is to be appreciated that red bean extract has thermogenic properties, further bolstering the weight loss effects of the composition.

It is to be further appreciated that other ratios of the above-mentioned components may be included depending upon effectiveness in a given patient. Further, other components may be added and/or substituted into the composition. Such components include ephedra and/or chitosan.

In another embodiment, the weight loss composition includes 200 mg–600 mg of chitosan, along with 200 mg–600 mg of garcinia cambogia, 25 mg–100 mg of glucomanan, and 50 mcg–200 mcg of chromium picolinate. Preferably, this embodiment includes a dosage to be taken three times per day, where each dosage includes 50 mg of glucomanan, 300 mg of garcinia cambogia; 100 mcg of chromium picolinate, 400 mg of chitosan and 5 mg of Mexican yam.

In a preferred embodiment, the weight loss composition takes form in a freely soluble powder mixture. Most preferably, the powder composition is added to foods, such as soups, juices, pudding, and yogurt, without materially affecting the taste of such foods. Alternatively, the powder composition is added to water, forming in effect, a weight loss water. Adding the powder composition to lower-fat, higher nutrition foods further bolsters the weight loss benefits of the composition.

While the present invention has been described with reference to promoting weight loss in humans, it is to be appreciated that it finds application in promoting weight loss in animals as well.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A dietary supplement composition comprising:
   an effective amount of glucomanan;
   an effective amount of chromium picolinate; and
   an effective amount of garcinia cambogia.
2. The dietary supplement composition according to claim 1 further comprising:
   an effective amount of guar gum.
3. The dietary supplement composition according to claim 1 further comprising:
   an effective amount of chitosan.
4. The dietary supplement composition according to claim 2 further comprising:
   an effective amount of red bean extract.
5. The dietary supplement composition according to claim 3 further comprising:
   an effective amount of Mexican yam.
6. The dietary supplement composition according to claim 2, wherein the composition takes form in a freely soluble powder.
7. The dietary supplement composition according to claim 2, wherein a dosage to be taken three times daily includes:
   glucomanan in an amount ranging from 50 mg to 75 mg;
   garcinia cambogia in an amount ranging from 300 mg to 500 mg;
   chromium picolinate in an amount ranging from 100 mcg to 200 mcg; and
   guar gum in an amount ranging from 50 mg to 75 mg.
8. The dietary supplement composition according to claim 3, wherein a dosage to be taken three times daily includes:
   glucomanan in an amount ranging from 50 mg to 75 mg;
   garcinia cambogia in an amount ranging from 300 mg to 500 mg;
   chromium picolinate in an amount ranging from 100 mcg to 200 mcg; and
   chitosan in an amount ranging from 400 mg to 500 mg.
9. A composition comprising a dosage taken three times per day of a freely soluble powder comprising glucomanan, chromium picolinate, and garcinia cambogia in an amount effective for reducing and controlling weight.
10. The composition of claim 9, wherein the dosage taken three times per day includes:
    50 mg of glucomanan;
    300 mg of garcinia cambogia;
    100 mcg of chromium picolinate;
    400 mg of chitosan; and
    5 mg of Mexican yam.
11. The composition of claim 9, wherein the dosage taken three times per day includes:
    75 mg of glucomanan;
    500 mg of garcinia cambogia;
    100 mcg of chromium picolinate;
    50 mg of guar gum; and
    5 mg of red bean extract.
12. A method of reducing and controlling weight comprising the steps of:
    administering three times a day to a subject an effective amount of a freely soluble powder composition comprising:
    garcinia cambogia in an amount ranging from 200 mg to 300 mg;
    glucomanan in an amount ranging from 25 mg to 100 mg;
    guar gum in an amount ranging from 25 mg to 100 mg;
    chromium picolinate in an amount ranging from 50 mcg to 200 mcg; and
    red bean extract in an amount ranging from 5 mg to 20 mg.
13. The method of claim 12, wherein the administering step includes:
    mixing the freely soluble powder composition with a liquid-based food.

14. The method of claim 12, wherein the administering step includes:
   mixing the freely soluble powder composition with one liter of water.

15. A dietary supplement composition which takes form in a freely soluble powder, said composition comprising:
   garcinia cambogia in an amount of 79% by weight of the total composition;
   glucomanan in an amount of 12% by weight of the total composition;
   guar gum in an amount of 8% by weight of the total composition;
   chromium picolinate in trace amounts by weight of the total composition; and
   red bean extract in an amount of no more than 1% by weight of the total composition.

16. A dietary supplement composition which takes form in a freely soluble powder mixed with one liter of water, said composition comprising:
   garcinia cambogia in an amount of 40% by weight of the total composition;
   glucomanan in an amount of 6% by weight of the total composition;
   chitosan in an amount of 53% by weight of the total composition;
   chromium picolinate in trace amounts by weight of the total composition; and
   Mexican yam in an amount of no more than 1% by weight of the total composition.

* * * * *